United States Patent
Otani (10) Patent No.: US 10,419,593 B2
(45) Date of Patent: Sep. 17, 2019

(54) WIRELESS COMMUNICATION DEVICE, COMMUNICATION SYSTEM, WIRELESS COMMUNICATION METHOD, AND STORAGE MEDIUM

(71) Applicant: CASIO COMPUTER CO., LTD., Tokyo (JP)

(72) Inventor: Daisuke Otani, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 16/015,515

(22) Filed: Jun. 22, 2018

(65) Prior Publication Data

US 2018/0375984 A1    Dec. 27, 2018

(30) Foreign Application Priority Data

Jun. 23, 2017   (JP) .................................. 2017-123333

(51) Int. Cl.
| | | |
|---|---|---|
| *H04B 7/00* | (2006.01) | |
| *H04M 1/725* | (2006.01) | |
| *H04N 1/00* | (2006.01) | |
| *H04N 1/32* | (2006.01) | |

(52) U.S. Cl.
CPC ..... *H04M 1/7253* (2013.01); *H04M 1/72533* (2013.01); *H04N 1/00106* (2013.01); *H04N 1/32101* (2013.01)

(58) Field of Classification Search
CPC ......... H04W 4/06; H04W 4/80; H04W 40/24; H04W 76/10; H04W 76/11; H04M 1/7253
USPC ...................................... 455/41.1, 41.2, 41.3
See application file for complete search history.

(56) References Cited

U.S. PATENT DOCUMENTS

| | | | |
|---|---|---|---|
| 9,144,095 B2* | 9/2015 | Sakamoto | ............. H04W 76/10 |
| 9,773,362 B2* | 9/2017 | Davis | .................. G07C 9/00111 |
| 10,116,832 B2* | 10/2018 | Yokoyama | ......... H04N 1/32776 |
| 2013/0090061 A1 | 4/2013 | Linde | |
| 2015/0304822 A1 | 10/2015 | Han et al. | |

(Continued)

FOREIGN PATENT DOCUMENTS

| | | |
|---|---|---|
| EP | 3115882 A1 | 1/2017 |
| EP | 3168743 A1 | 5/2017 |
| JP | 2000092700 A | 3/2000 |

(Continued)

OTHER PUBLICATIONS

EPO; Application No. 18179245.8; Extended European Search Report dated Nov. 7, 2018.

(Continued)

*Primary Examiner* — Quochien B Vuong
(74) *Attorney, Agent, or Firm* — Fitch, Even, Tabin & Flannery LLP (57) ABSTRACT

Re-connection processing is performed on the basis of suitable setting. An image capture apparatus is an image capture apparatus capable of performing wireless communication with a mobile terminal, and includes a connection control information setting unit and a communication control unit. The connection control information setting unit sets connection control information. A transmission interval of a wireless signal relevant to the wireless communication is controlled on the basis of the connection control information which is set is the connection control information setting unit.

12 Claims, 6 Drawing Sheets

(56) References Cited

U.S. PATENT DOCUMENTS

2017/0093595 A1  3/2017  Ito et al.

FOREIGN PATENT DOCUMENTS

| | | |
|---|---|---|
| JP | 2001-159936 A | 6/2001 |
| JP | 2004072653 A | 3/2004 |
| JP | 2006311077 A | 11/2006 |
| JP | 2015-119296 A | 6/2015 |
| JP | 2017091412 A | 5/2017 |
| WO | 2013183729 A1 | 12/2013 |

OTHER PUBLICATIONS

JPO; Application No. 2017-123333; Notice of Reasons for Refusal dated Jul. 23, 2019.

* cited by examiner

WIRELESS COMMUNICATION DEVICE, COMMUNICATION SYSTEM, WIRELESS COMMUNICATION METHOD, AND STORAGE MEDIUM

This application is based on and claims the benefit of priority from Japanese Patent Application No. 2017-123333, filed on Jun. 23, 2017, the content of which is incorporated herein by reference.

FIELD OF THE INVENTION

The present invention relates to a wireless communication device, a communication system, a wireless communication method, and a storage medium.

Conventionally, a technology of realizing a function of performing communication between an image capture apparatus and a mobile terminal, of transmitting and receiving imaging data, or of manipulating the image capture apparatus from the mobile terminal is known.

An example of such a technology is disclosed in JP 2017-91412 A. In a technology disclosed in JP 2017-91412 A, an imaging function of an image capture apparatus is controlled by as external device performing communication based on Bluetooth (Registered Trademark) low energy (BLE), such as a smart phone.

For example, a user manipulates the smart phone at time for the click of the shutter, and a power source of the image capture apparatus is turned on by BLE communication. Then, a BLE module of the image capture apparatus executes a handshake for initialization with respect to a microcomputer of the activated image capture apparatus, and downloads firmware from the microcomputer. In this case, in the technology disclosed in JP 2017-91412 A, control is performed such that the firmware is rapidly downloaded to a maximum extent, in order not to miss the time for the click of the shutter.

SUMMARY OF THE INVENTION

A wireless communication device according to an aspect of the present invention is capable of performing wireless communication with an external device, and the wireless communication device includes a processor, wherein the processor executes a program to perform operations comprising:

setting connection control information relevant to wireless connection with the external device; and controlling a transmission interval of a wireless signal relevant to the wireless communication, on the basis of the connection control information which is set in the setting.

A communication system according to an aspect of the present invention includes:

a wireless communication device capable of performing wireless communication with an external device; and the external device, wherein the wireless communication device includes a processor, the processor is further configured to set connection control information relevant to wireless connection with the external device; and the processor is further configured to control a transmission interval of a wireless signal relevant to the wireless communication, on the basis of the connection control information which is set in the setting, and the external device receives the wireless signal which is transmitted from the wireless communication at a transmission interval controlled by the processor, and responds to the received wireless signal, and thus, establishes the wireless connection with the wireless communication device, and performs the wireless communication between the wireless communication device and the external device by the established wireless connection.

A wireless communication method according to an aspect of the present invention is executed by a wireless communication device capable of performing wireless communication with an external device, and the method includes:

setting connection control information relevant to wireless connection with the external device; and controlling a transmission interval of a wireless signal relevant to the wireless communication, on the basis of the connection control information that has been set.

A non-transitory storage medium according to an aspect of the present invention contains a wireless communication program allowing a computer capable of performing wireless communication with an external device to realize:

setting connection control information relevant to wireless connection with the external device; and controlling a transmission interval of a wireless signal relevant to the wireless communication, on the basis of the connection control information set by the setting function.

In a case where the following detailed description is considered along with the following drawings, more detailed understanding of the present application will be obtained. According to the present invention, re-connection processing can be performed on the basis of suitable setting.

DETAILED DESCRIPTION OF THE INVENTION

Figure 1:
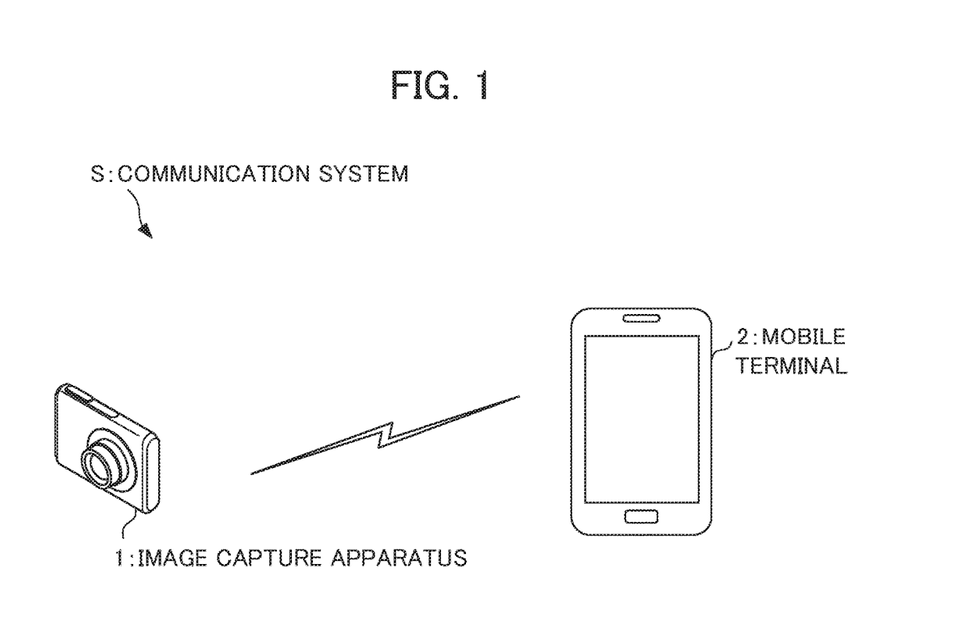
FIG. 1 is a system configuration diagram illustrating a system configuration of a communication system S.

Hereinafter, an embodiment of the present invention will be described by using the drawings. FIG. 1 is a system configuration diagram illustrating a system configuration of a communication system S according to one embodiment of the present invention.

As illustrated in FIG. 1, a communication system S includes an image capture apparatus 1 and a mobile terminal 2. The image capture apparatus 1 has at least a capturing function, and a communication function of performing short-distance wireless communication with the mobile terminal 2. Furthermore, the image capture apparatus 1 is a device performing wireless communication, and corresponds to the "wireless communication device" in the present invention. The mobile terminal 2 has at least a communication function of performing short-distance wireless communication with the image capture apparatus 1. Furthermore, the mobile terminal 2 is an external device separate from the image capture apparatus 1, and corresponds to the "external device" in the present invention.

In this embodiment, the short-distance wireless communication is Bluetooth (Registered Trademark) low energy (BEE) communication, the mobile terminal 2 has a central function in BLE connection, and the image capture apparatus 1 has a peripheral function in the BLE connection.

In the communication system S, even in a state where a main power source of the image capture apparatus 1 is turned off, it is possible to maintain a short-distance wireless communication function, and the image capture apparatus 1 transmits an advertising signal even in a state where the main power source is turned off. Connection processing is performed by taking a response of the mobile terminal 2 with respect to the advertising signal transmitted from the image capture apparatus 1, as an opportunity, and communication connection between the image capture apparatus 1 and the mobile terminal 2 is established. The advertising signal is information necessary for network management between the wireless communication devices, and is transmitted for discovery and connection of the device. In addition, for example, in a case where communication data is encoded, information for defining how a key is exchanged is included.

In such a state, in a case where a certain BLE event (for example, an event that the mobile terminal 2 approaches the image capture apparatus 1) occurs, in the image capture apparatus 1 in a state where the main power source other than the communication function is turned off, the main power source is automatically turned on, and activation processing of the image capture apparatus 1 (initialization processing, preparation processing for capturing, or the like) is performed. In addition, according to this, a short-distance wireless communication unit realizing the short-distance wireless communication function of the image capture apparatus 1 is reset. Then, re-connection processing is performed between the reset short-distance wireless communication unit and the mobile terminal 2. In a case where the re-connection processing is ended, processing such as capturing is automatically executed according to an operation mode. That is, in the image capture apparatus 1, a certain BLE event occurs, and thus, connection processing, and the subsequent predetermined processing are automatically performed.

In such a communication system S, connection control information is set according to a usage condition relevant to the short-distance wireless communication between the image capture apparatus 1 and the mobile terminal 2. Here, the connect on control information, for example, includes an advertising interval which is a cycle for transmitting the advertising packet, or a length of time for performing the re-connection processing. Then, in the re-connection processing, the image capture apparatus 1 performs re-connection of wireless communication by performing control on the basis of the set connection control information. That is, in the communication system S, the re-connection processing can be performed on the basis of suitable setting according to the usage condition relevant to the short-distance wireless communication.

For example, a situation in which a user uses the image capture apparatus 1 and the mobile terminal 2 in cooperation by the short-distance wireless communication, but the power source of the image capture apparatus 1 is turned off once, is considered as a specific example. In such a situation, in a case where the BLE event occurs, it is considered that the user uses again the image capture apparatus 1 and the mobile terminal 2 in cooperation by the short-distance wireless communication. Therefore, it is desirable that the re-connection processing is rapidly performed. Therefore, in such a case, for example, even in a case where the power consumption increases, for example, the advertising interval is set to be short, and thus, rapid connection is performed.

In a case where even though it is not clear whether or not the user intentionally uses the image capture apparatus 1 and the mobile terminal 2 in cooperation by the short-distance wireless communication, but the BLE event occurs due to approach of the image capture apparatus 1 with respect to the mobile terminal 2, it may not be necessary to rapidly perform the re-connection processing, as another example. Therefore, in such a case, for example, even in a case where it takes time for the connection, for example, it is possible to reduce the power consumption by setting the advertising interval to be long.

In the communication system S, in order to perform such cutoff, a usage condition of whether or not the short-distance wireless communication is performed when the power source of the image capture apparatus 1 is turned off, is recorded. Then, when the image capture apparatus 1 is re-activated, and performs the re-connection, setting is performed according to the recorded usage condition, and thus, it is possible to perform the re-connection processing based on suitable setting according to the usage condition.

Figure 2:
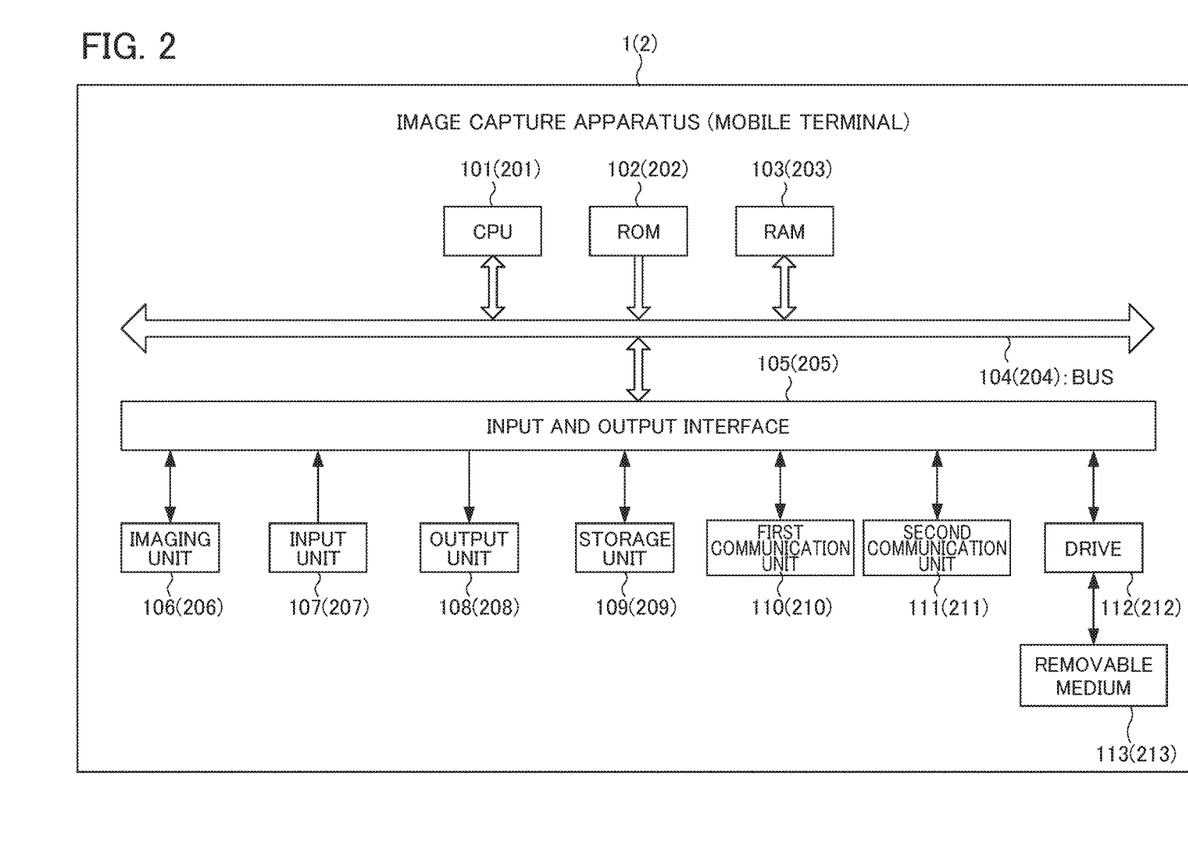
FIG. 2 is a block diagram illustrating a hardware configuration of as image capture apparatus 1 and a mobile terminal 2.

FIG. 2 is a block diagram illustrating a hardware configuration of the image capture apparatus 1 and the mobile terminal 2 according to one embodiment of the present invention. Here, the hardware configurations of the image capture apparatus 1 and the mobile terminal 2 are in common, and thus, each of the reference numerals will be illustrated in one drawing. Specifically, the reference numerals in the image capture apparatus 1 will be illustrated without parentheses, and the reference numerals in the mobile terminal 2 will be illustrated with parentheses.

Furthermore, the overlapping described will be omitted, and the hardware configuration of the image capture apparatus 1 will be described as an example, with reference to FIG. 2. Here, in the description with reference to FIG. 2 described below, the hardware configuration of the mobile terminal 2 will be described by replacing the image capture apparatus 1 with the mobile terminal 2, by replacing the mobile terminal 2 with the image capture apparatus 1, and by replacing the reference numerals in the image capture apparatus 1 with the reference numerals in the mobile terminal 2. Here, the image capture apparatus 1, for example, is configured of a digital camera. In addition, the mobile terminal 2, for example, is configured of a smart phone.

The image capture apparatus includes a CPU (Central Processing Unit) 101 serving as a processor, a ROM (Read Only Memory) 102, a RAM (Random Access Memory) 103, a bus 104, an input and output interface 105, an image capture unit 106, an input unit 107, an output unit 108, a storage unit 109, a first communication unit 110, a second communication unit 111, and a drive 112.

The CPU 101 executes various processes according to a program recorded in the ROM 102 or a program loaded from the storage unit 109 into the RAM 103.

The RAM 103 also stores data and the like necessary for the CPU 101 to execute various processes as appropriate.

The CPU 101, the ROM 102, and the RAM 103 are mutually connected via the bus 104. The input and output interface 105 is also connected to the bus 104. The input and output interface 105 is also connected to the image capture unit 106, the input unit 107, the output unit 108, the storage unit 109, the first communication unit 110, the second communication unit 111, and the drive 112.

Although not shown, the image capture unit 106 includes an optical lens unit and an image sensor. Here, the image capture unit 106 is a unit that implements the image capture function as a predetermined function, and corresponds to "function execution means realizing a predetermined function" or "an executer realizing a predetermined function" according to the present invention. Note that the predetermined function may be the input unit 107, the output unit 108, the storage unit 109, the first communication unit 110, the second communication unit 111, and the drive 112. The optical lens unit is composed of a lens that collects light, for example, a focus lens, a zoom lens, etc., in order to photograph a subject. The focus lens is a lens that forms a subject image on the light receiving surface of the image sensor. The zoom lens is a lens that freely changes the focal length within a certain range. A peripheral circuit for adjusting setting parameters such as focus, exposure, white balance and the like is provided in the optical lens unit as necessary.

The image sensor is composed of a photoelectric conversion element, an AFE (Analog Front End) and the like. The photoelectric conversion element is composed of, for example, a CMOS (Complementary Metal Oxide Semiconductor) type photoelectric conversion element or the like. A subject image is incident on the photoelectric conversion element from the optical lens unit. Therefore, the photoelectric conversion element photoelectrically converts (capture) the subject image, accumulates an image signal for a certain period of time, and sequentially supplies the accumulated image signal to the AFE as an analog signal.

The AFE executes various signal processing such as A/D (Analog/Digital) conversion processing and the like on the analog image signal. A digital signal is generated by various kinds of signal processing and output as an output signal of the image capture unit 106. Such an output signal of the image capture unit 106 is hereinafter referred to as "captured image data".

Data of the captured image is appropriately supplied to the CPU 101, an image processing unit (not shown), and the like.

The input unit 107 is composed of various buttons and the like, and inputs various information according to an instruction operation by a user. The output unit 108 includes a display, a speaker, and the like, and outputs images and sounds. The storage unit 109 is made of a DRAM (Dynamic Random. Access Memory) and the like, and stores data of various images.

A first communication unit 110 is configured of a wireless IC module or the like, and controls communication with the external device (in this embodiment, the mobile terminal 2), in a communication system based on a BLE communication standard. Furthermore, in the image capture apparatus 1, it is possible to turn off the power source other than the first communication unit 110. That is, even though it is not illustrated, a power source unit of the image capture apparatus 1 is configured such that a sub-power source, which is a power source for allowing the first communication unit 110 to function, and a main power source, which is a power source for allowing main parts other than the first communication unit 110 to function, can be each independently turned ON/OFF. The power source unit can be configured such that in a case where communication with the other device is established by the first communication unit 110, in a state where only the sub-power source is turned on, the main power source is automatically turned on by a power source ON signal output from the first communication unit 110 to the main power source unit.

A second communication unit 111 is configured of a wireless IC module or the like, and controls the communication with the external device (in this embodiment, the mobile terminal 2), in a communication system based on a Wi-Fi communication standard. The communication, for example, can be realizes by a communication method referred to as an ad hoc mode or Wi-Fi Direct in the Wi-Fi communication standard.

A removable medium 113 formed of a magnetic disk, an optical disk, a magnetooptical disk, a semiconductor memory, or the like, is suitably mounted on a drive 112. A program read out from the removable medium 113 by the drive 112, is installed in a storage unit 109, as necessary. In addition, the removable medium 113 is also capable of recording various data items such as data of an image recorded in the storage unit 109, as with the storage unit 109.

Figure 3:
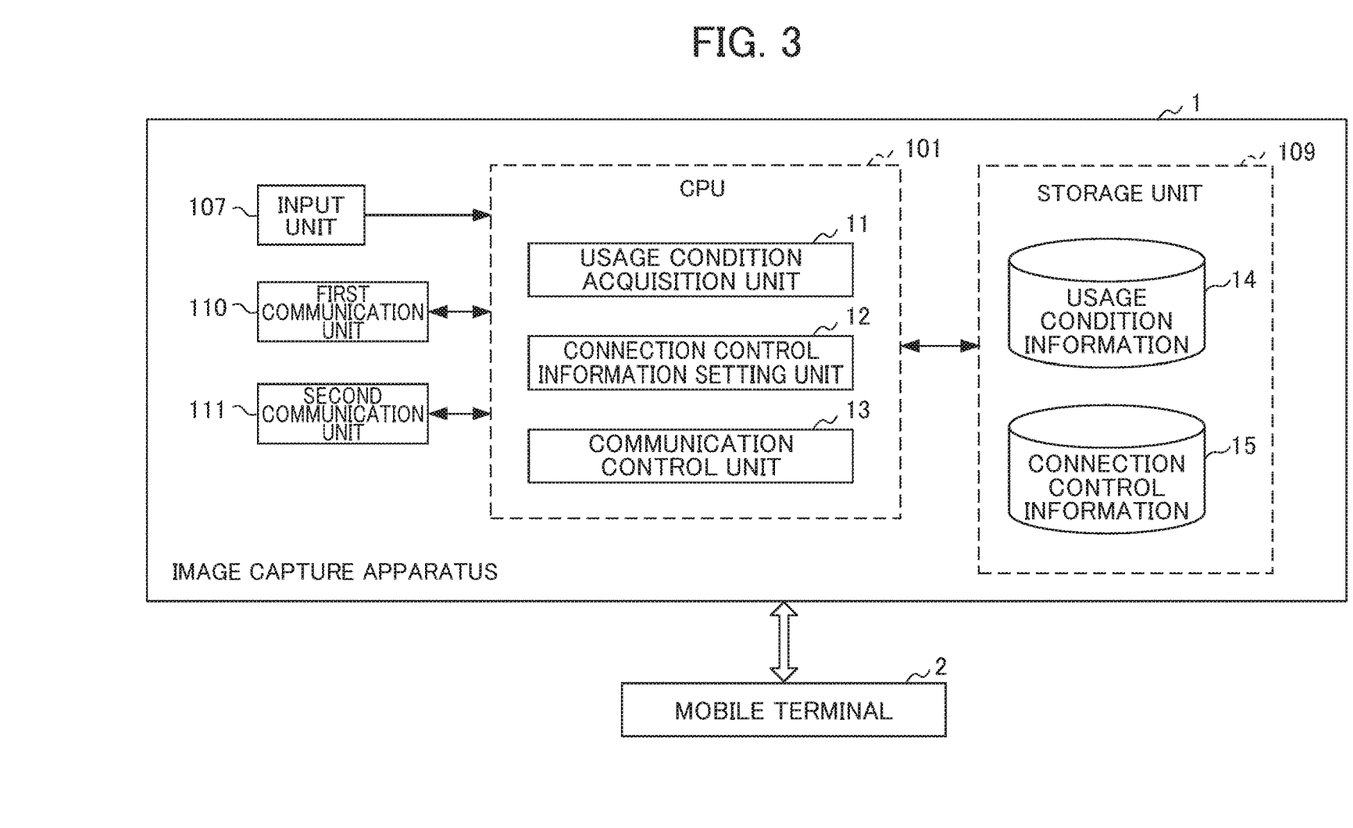
FIG. 3 is a block diagram illustrating a functional configuration of the image capture apparatus of FIG. 2.

FIG. 3 is a functional block diagram illustrating a functional configuration for executing connection processing, in the functional configuration of the image capture apparatus 1. The connection processing is a set of processing of performing the re-connection or the like by taking the occurrence of the BLE event, as an opportunity.

In a case where the connection processing is executed, as illustrated in FIG. 3, a CPU 101, a usage condition acquisition unit 11, a connection control information setting unit 12, and a communication control unit 13, function.

In addition, usage condition information 14, which is information indicating a usage condition, and connection control information 15 are recorded in one recording region of the storage unit 109. Furthermore, even in a case where the main power source of the image capture apparatus 1 is turned off, a recording region recording at least the usage condition information 14 of the storage unit 109 is realized by a non-volatile recording device such that the usage condition information 14 is retained.

In the connection processing, the usage condition acquisition unit 11, the connection control information setting unit 12, and the communication control unit 13 execute the following processing. The usage condition acquisition unit 11 acquires the usage condition relevant to the short-distance wireless communication between the image capture apparatus 1 and the mobile terminal 2. The usage condition acquisition unit 11 generates usage condition information 14, which is information indicating the acquired usage condition, and records the generated usage condition information 14 in the storage unit 109. The usage condition information 14, for example, includes information indicating a usage condition of whether the image capture apparatus 1 and the mobile terminal 2 are in the communication connection based on the BLE or in advertising without performing the communication connection, at a time point when the main power source of the image capture apparatus 1 is turned off. In this case, a time when the main power source is turned off, can be further included in the usage condition information 14.

In addition, information indicating a usage condition of whether the image capture apparatus 1 and the mobile terminal 2 actually perform communication such as transmission and reception of image data during the communication connection based on the BLE, or only perform the communication connection but do not particularly perform the substantial communication such as transmission and reception of data, can be further included in the usage condition information 14.

The connection control information setting unit 12 reads out the usage condition information 14 from the storage unit 109, and sets the connection control information 15 on the basis of the read-out usage condition information 14, at the time of executing the re-connection processing.

Then, the connection control information setting unit 12 records the set connection control information 15 in the storage unit 109. Here, the connection control information 15, for example, includes the advertising interval which is the cycle for transmitting the advertising packet, the length of time for performing the re-connection processing, and time after a group of re-connection processings are performed before the next group of re-connection processings are performed. The group of re-connection processings, for example, indicates a length of time for performing the re-connection processing represented by a reference numeral of "T" of FIG. 4.

Here, the connection control information setting unit 12 selects any one advertising mode, on the basis of the usage condition information 14, and thus, the advertising interval is set in this embodiment, three advertising modes of a connection priority mode, a normal mode, and a connection non-priority mode, described below, are prepared.

Figure 4:
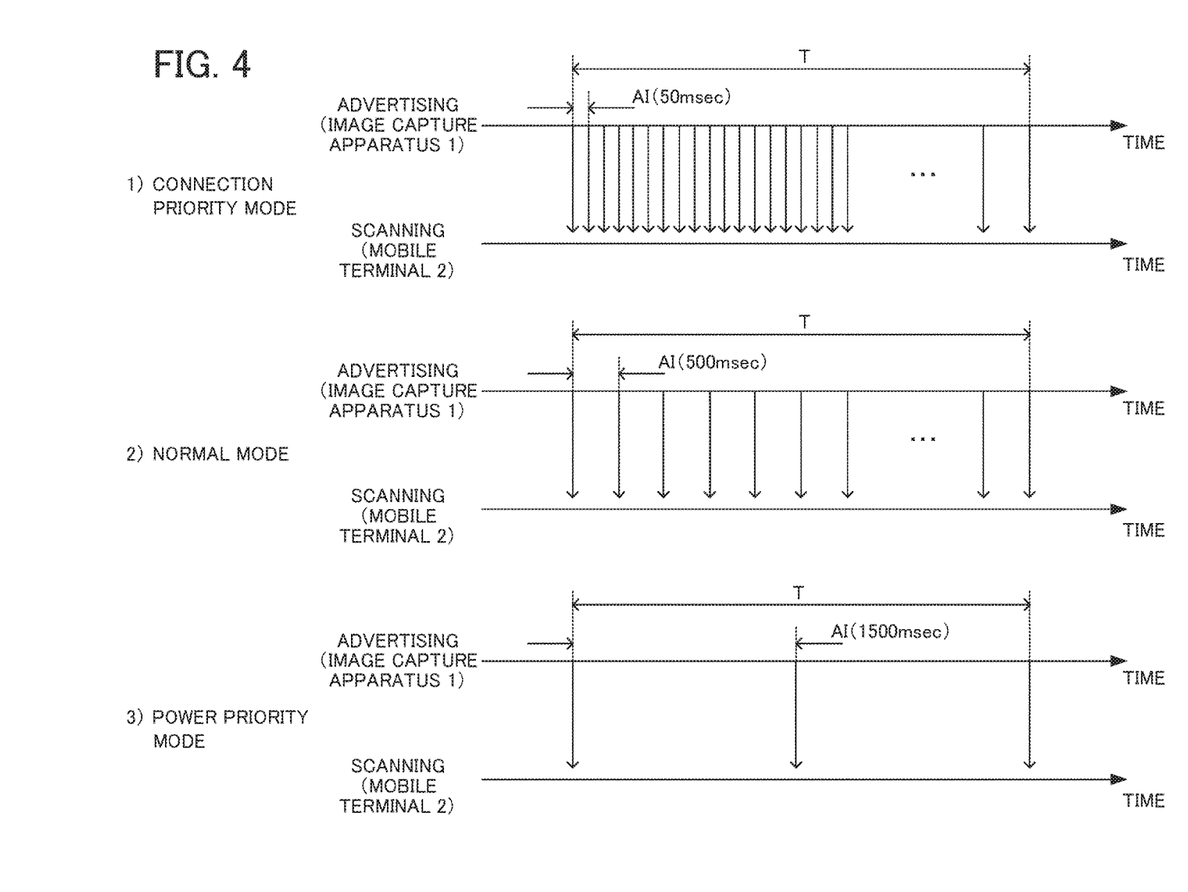
FIG. 4 is a schematic view illustrating an advertising mode which is set by the image capture apparatus 1.

<Advertising Mode, and Setting Contents Thereof>
Connection Priority Mode→advertising interval_50 msec
Normal Mode→advertising interval_500 msec
Connection non-priority Mode→advertising interval_1500 msec These three advertising modes will be described with reference to FIG. 4. Here, FIG. 4 is a diagram illustrating three advertising modes of the connection priority mode, the normal mode, and the connection non-priority mode. Here, an arrow directed towards the mobile terminal 2 from the image capture apparatus 10, in the drawing, indicates the transmission of the advertising packet. The advertising packet is intermittently transmitted on the basis of the set advertising interval. Here, in the BLE, the transmission of the advertising packet is paused after the advertising packet is transmitted during an initial predetermined period of the advertising interval and until the next advertising interval arrives. In FIG. 4, the initial predetermined period of the advertising interval is illustrated by one arrow.

Furthermore, for the convenience of illustration, FIG. 4 is a schematic view, and a length ratio of the advertising intervals is different from the actual length ratio of the illustrated advertising intervals. For example, the advertising interval in the connection priority mode is 50 msec, and the advertising interval in the normal mode is 500 msec, and a ratio thereof is 10 times, but in the drawing, the ratio of the advertising intervals is not 10 times.

In a case where the connection control information setting unit 12 selects the "connection priority mode" as the advertising mode, as illustrated in the upper stage of FIG. 4, the advertising interval is a cycle of 50 msec. The connection control information setting unit 12 selects a short cycle as described above, and thus, it is possible to realize the most rapid re-connection among all modes.

In addition, in a case where the connection control information setting unit 12 selects the "normal mode" as the advertising mode, as illustrated in the middle stage of FIG. 4, the advertising interval is a cycle of 500 msec. The connection control information setting unit 12 selects a short cycle as described above, and thus, it is possible to realize more rapid re-connection than the connection non-priority mode, and to realize more reduction in the power consumption than the connection priority mode.

In a case where the connection control information setting unit 12 selects the "connection non-priority mode" as the advertising mode, as illustrated in the lower stage of FIG. 4, the advertising interval is a cycle of 1500 msec. The connection control information setting unit 12 selects a long cycle as described above, and thus, it is possible to realize the most reduction in the power consumption among all modes.

In addition, the connection control information setting unit 12 selects the number of seconds determined in advance, on the basis of the usage condition information 14, and thus, the length of time for performing the re-connection processing (corresponding to a reference numeral of "T" of FIG. 4) is set. The number of seconds determined in advance, for example, is the number of seconds of 5 seconds or 10 seconds.

Figure 5:
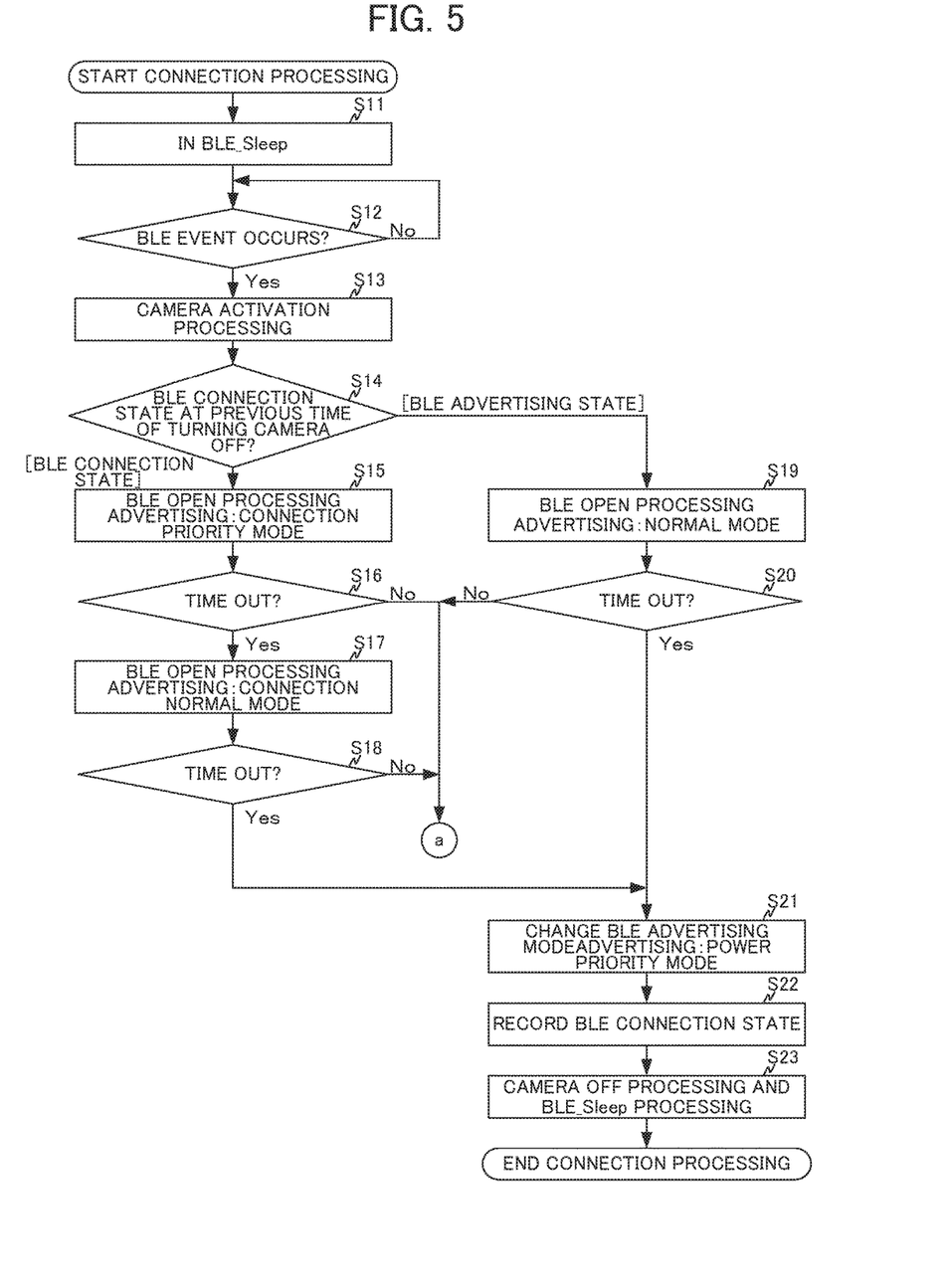
FIG. 5 is a flowchart (1/2) illustrating a flow of connection processing which is executed by the image capture apparatus 1 of FIG. 2, having the functional configuration of FIG. 3.
Figure 6:
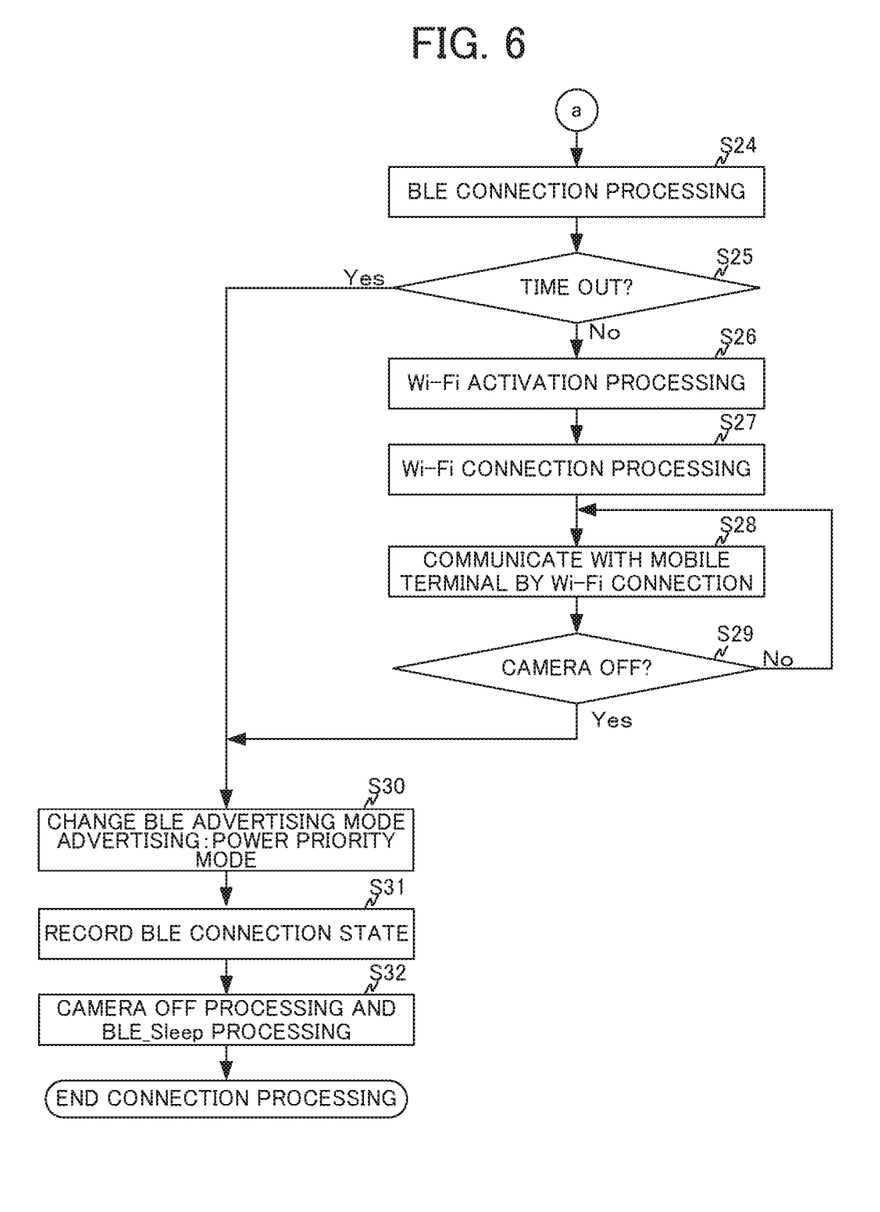
FIG. 6 is a flowchart (2/2) illustrating the flow of the connection processing which is executed by the image capture apparatus 1 of FIG. 2, having the functional configuration of FIG. 3.

Which advertising mode is specifically selected and set, or which length of time is selected and set by the connection control information setting unit 12, on the basis of which usage condition information 14, will be described below with reference to flowcharts of FIG. 5 and FIG. 6.

The communication control unit 13 reads out the connection control information 15 recorded in the storage unit 109 which is set by the connection control information setting unit 12. Then, in the connection processing, the communication control unit 13 controls the first communication unit 110 under the control based on the set connection control information, and thus, performs the re-connection of the wireless communication based on the BLE. Specfically, the communication control unit 13 controls the first communication unit 110 such that the advertising packet is transmitted at a cycle corresponding to the advertising mode which is set by the connection control information 15. In addition, the communication control unit 13 controls the first communication unit 110 such that the re-connection of the wireless communication based on the BLE is performed only for a length of time, which is set by the connection control information 15.

Further, the communication control unit 13 also controls communication based on Wi-Fi between the image capture apparatus 1 and the mobile terminal 2, using the second communication unit 111.

Specific contents of the usage condition information 14 and the connection control information 15, recorded in the storage unit 109, are as described above.

Next, an operation of this embodiment will be described with reference to FIG. 5 and FIG. 6. FIG. 4 and FIG. 6 are flowcharts illustrating a flow of the connection processing which is executed by the image capture apparatus 1 of FIG. 2, having the functional configuration of FIG. 3. The connection processing is started in a case where the main power source of the image capture apparatus 1 is in an off state.

In Step S11, the image capture apparatus 1 is in a state of BLE_Sleep. Here, the state of BLE_Sleep is a state in which the main power source of the image capture apparatus 1 is turned off, but power is supplied to a BLE module realizing the first communication unit 110, and thus, the first communication unit 110 is activated in a communication enabled state. In this state, the first communication unit 110 transmits the advertising packet, and is capable of establishing the communication connection with the mobile terminal 2 responding to the advertising packet, on the basis of the BLE.

In Step S12, the first communication unit 110 determines whether or not the BLE event occurs. Here, in a case where the BLE event does not occur, it is determined as No in Step S12, and the processing of Step S12 is repeated in the state of BLE_Sleep. On the other hand, in a case where the BLE event occurs, it is determined as Yes in Step S12, the processing proceeds to Step S13. Here, as an example of the BLE event, any one of three events described below occurs with respect to the mobile terminal 2 which has been paired on the basis of the BLE.

<Example of BLE Event>

The current BLE connection is cut, as a distance between the image capture apparatus 1 and the mobile terminal 2 becomes shorter. The BLE connection is newly established, as the distance between the image capture apparatus 1 and the mobile terminal 2 becomes longer. The mobile terminal 2 receives a predetermined manipulation from the user, and transmits a command according to the manipulation received by the mobile terminal 2, with respect to the image capture apparatus 1. Here, the predetermined manipulation, for example, includes a manipulation for cutting the current BLE connection, a manipulation for newly establishing the BLE connection, a manipulation for establishing connection based on Wi-Fi between the mobile terminal 2 and the image capture apparatus 1, or the like.

In Step S13, the main power source of the image capture apparatus 1 is turned on by taking the occurrence of the BLE event, as an opportunity, and the image capture apparatus 1 performs camera activation processing. The activation processing, for example, is bare minimum activation processing such as initialization processing or preparation processing for capturing.

In Step S14, the connection control information setting unit 12 reads out the usage condition information 14 which is recorded in the storage unit 109. The usage condition information 14 includes information indicating a BLE connection state when the main power source of the image capture apparatus 1 at the time of previously performing the wireless communication is turned off. Then, the connection control information setting unit 12 determines which state is indicated by the BLE connection state when the main power source of the image capture apparatus 1 at the time of performing the wireless communication is turned off, on the basis of the information indicating the BLE connection state, in order to set the connection control information.

In a case of a state where the image capture apparatus 1 and the mobile terminal 2 establish the BLE connection when the main power source of the image capture apparatus 1 at the time of performing the wireless communication is turned off, it is determined as [BLE Connection State] in Step S14. In this case, it is considered that the image capture apparatus 1 and the mobile terminal 2 establish the BLE connection when the main power source of the image capture apparatus 1 at the time of performing the wireless communication is turned off, and thus, the user intentionally allows the BLE event to occur in order to perform the BLE connection again. For this reason, the connection control information setting unit 12 sets the advertising mode of the connection control information 15 to the "connection priority mode", and the length of time for performing the re-connection processing to "5 seconds" such that the re-connection can be rapidly performed, and the processing proceeds to Step S15.

On the other hand, in a case where the image capture apparatus 1 and the mobile terminal 2 do not establish the BLE connection when the main power source of the image capture apparatus 1 at the time of performing the wireless communication is turned off, but the image capture apparatus 1 is in a state where the advertising packet is transmitted, it is determined as [BLE Advertising State] in Step S14. In this case, the image capture apparatus 1 and the mobile terminal 2 do not establish the BLE connection when the main power source of the image capture apparatus 1 at the time of performing the wireless communication is turned off, and thus, it is not clear whether or not the user intentionally allows the BLE event to occur in order to perform the BLE connection, and rapid re-connection is not necessary. For this reason, the connection control information setting unit. 12 sets the advertising mode of the connection control information 15 to the "normal mode", and the length of time for performing the re-connection processing to "10 seconds" such that the power is not unnecessarily consumed, and the processing proceeds to Step S15.

In Step S15, the communication control unit 13 performs BLE open processing of transmitting the advertising packet at a cycle of 50 msec, which is an advertising interval corresponding to the connection priority mode, on the basis of the setting of the connection control information 15.

In Step S16, the communication control unit 13 determines whether or not "5 seconds" elapsed after the transmission of the advertising packet in Step S15 is started while not having a response with respect to the advertising packet from the mobile terminal 2, and thus, time out occurs, on the basis of the setting of the connection control information 15. In a case where there is a response from the mobile terminal 2 before 5 seconds elapsed, it is determined as No in Step S16, and the processing proceeds to Step S24 of FIG. 6.

On the other hand, in a case where there is no response from the mobile terminal 2 until 5 seconds elapsed, it is determined as Yes in Step S16. In this case, the image capture apparatus 1 and the mobile terminal 2 establish the BLE connection when the main power source of the image capture apparatus 1 at the time of performing the wireless communication is turned off, but there is no response until 5 seconds elapsed, and thus, it is not clear whether or not the user intentionally allows the BLE event to occur in order to perform the BLE connection, and rapid re-connection is not necessary. For this reason, the connection control information setting unit 12 sets the advertising mode of the connect iron control information 15 to the "normal mode", and the length of time for performing the re-connection processing to "5 seconds" such that the power is not unnecessarily consumed, and the processing proceeds to Step S17.

In Step S17, the communication control unit 13 performs the BLE open processing of transmitting the advertising packet at a cycle of 500 msec, which is an advertising interval corresponding to the connection normal mode, on the basis of the setting of the connection control information 15.

In Step S18, the communication control unit 13 determines whether or not "5 seconds" elapsed after the transmission of the advertising packet in Step S17 is started while not having a response with respect to the advertising packet from the mobile terminal 2, and thus, time out occurs, on the basis of the setting of the connection control information 15. In a case where there is a response from the mobile terminal 2 before 5 seconds elapsed, it is determined as No in Step S18, and the processing proceeds to Step S24 of FIG. 6.

On the other hand, in a case where there is no response from the mobile terminal 2 until 5 seconds elapsed, it is determined as Yes in Step S18. In this case, it is considered that the user does not intentionally perform the re-connection, and thus, the BLE open processing is not performed any more, and the processing proceeds to Step S21.

In Step S21, the connection control information setting unit 12 sets the advertising mode of the connection control information 15 to the "connection non-priority mode", and the length of time for performing the re-connection processing to "no constraint" such that the power is not unnecessarily consumed, at the time of being in the state of BLE_Sleep, and the processing proceeds to Step S22.

In Step S22, the usage condition acquisition unit 11 acquires the current BLE connection state as the usage condition, before the main power source of the camera is turned off. In this case, the usage condition acquisition unit 11 acquires a usage condition in which the current BLE connection is not established, but the image capture apparatus 1 only transmits the advertising packet.

Then, the usage condition acquisition unit 11 generates the usage condition information 14 indicating the acquired usage condition, and records the generated usage condition information 14 in the storage unit 109.

In Step S23, the main power source is turned off, and processing for being in the state of BLE_Sleep is performed. In the state of BLE_Sleep, the BLE open processing of transmitting the advertising packet at a cycle of 1500 msec, which is an advertising interval corresponding to the connection non-priority mode, is performed, and the processing from Step S11 is repeated again, on the basis of the setting of the connection control information 15 in Step S21.

In Step S19, the communication control unit 13 performs the BLE open processing of transmitting the advertising packet at a cycle of 500 msec, which is an advertising interval corresponding to the connection normal mode, on the basis of the setting of the connection control information 15.

In Step S20, the communication control unit 13 determines whether or not "10 seconds" elapsed after the transmission of the advertising packet in Step S19 is started while not having a response with respect to the advertising packet from the mobile terminal 2, and thus, time out occurs, on the basis of the setting of the connection control information 15. In a case where there is a response from the mobile terminal 2 before 10 seconds elapsed, it is determined as No in Step S20, and the processing proceeds to Step S24 of FIG. 6.

On the other hand, in a case where there is no response from mobile terminal 2 until 10 seconds elapsed, it is determined as Yes in Step S20. In this case, it is considered that the user does not intentionally perform the re-connection, the BLE open processing is not performed any more, and the processing proceeds to Step S21.

The processing after Step S21 is as described above.

The connection processing will be continuously described with reference to FIG. 6. In Step S24, BLE connection processing is performed under the control of the communication control unit 13. Accordingly, the communication connection based on the BLE is established between the image capture apparatus 1 and the mobile terminal 2.

In Step S25, the communication control unit. 13 determines whether or not a predetermined period of time elapsed after the communication connection is established in Step S24 while not having a certain request, and thus, time out occurs, by using the BLE connection from the mobile terminal 2. Furthermore, in this description, it is assumed that a predetermined period of time is set to 5 seconds.

In a case where 5 seconds elapsed after the communication connection is established in Step S24, while not having a certain request, and thus, time out occurs, by using the BLE connection from the mobile terminal 2, it is determined as Yes Step S25, and the processing proceeds to Step S30. On the other hand, in a case where there is no response of a certain request before 5 seconds elapsed using the BLE connection from the mobile terminal 2, it is determined as No in Step S25, and the processing proceeds to Step S26 of FIG. 6. This time, it is assumed that there is an establishment request of the Wi-Fi connection by using the BLE connection from the mobile terminal 2.

In Step S26, the communication control unit 13 performs processing of activating the second communication unit 111 in order to perform the Wi-Fi connection.

In Step S27, the communication control unit 13 performs processing for performing the Wi-Fi connection with the mobile terminal 2, by controlling second communication unit 111. Furthermore, the processing for performing the Wi-Fi connection is well known to a person skilled in the art, and thus, the detailed description thereof will be omitted herein.

In Step S28, the communication based on the Wi-Fi connection is performed between the image capture apparatus 1 and the mobile terminal 2. Here, the data which is transmitted and received by the communication, is not particularly limited, and for example, the image data which is obtained by performing imaging with the image capture apparatus 1, is transmitted with respect to the mobile terminal 2 from the image capture apparatus 1.

In addition, for example, an imaging execution instruction (that is, an instruction corresponds to a press of a shutter) is transmitted with respect to the image capture apparatus 1 from the mobile terminal 2.

In Step S29, the communication control unit 13 determines whether or not a manipulation of turning off the main power source of the image capture apparatus 1 is performed. In a case where the manipulation of turning off the main power source is not performed, it is determined as No in Step S29, the communication which is started in Step S28 is continued, and the processing of Step S29 is repeated.

On the other hand, in a case where the manipulation of turning off the main power source is performed, it s determined as Yes in Step S29, and the processing proceeds to Step S30.

In Step S30, the connection control information setting unit 12 sets the advertising mode of the connection control information 15 to the "connection non-priority mode", and the length of time for performing the re-connection processing to "no constraint" such that the power is not unnecessarily consumed, at the time of being in the state of BLE_Sleep, and the processing proceeds to Step S31.

In Step S32, the usage condition acquisition unit 11 acquires the current BLE connection state as the usage condition, before the main power source of the camera is turned off. In this case, the usage condition acquisition unit 11 acquires a usage condition in which the current BLE connection is established. Then, the usage condition acquisition unit 11 generates the usage condition information 14 indicating the acquired usage condition, and records the generated usage condition information 14 in the storage unit 109.

In Step S32, the main power source is turned off, and the processing for being in the state of BLE_Sleep is performed. In the state of BLE_Sleep, the BLE open processing of transmitting the advertising packet at a cycle of 1500 msec, which is an advertising interval corresponding to the connection non-priority mode, is performed, and the processing from Step S11 is repeated again, on the basis of the setting of the connection control information 15 in Step S30.

According to the operation of this embodiment described above, the connection control information setting unit 12 sets the connection control information on the basis of the usage condition information. 14, and thus, it is possible for the communication control unit 13 to perform the re-connection processing on the basis of suitable setting. For example, it is possible to perform the re-connection processing on the basis of suitable setting, as with Step S15, Step S17, and Step S19 described above.

In addition, according to the operation of this embodiment, the connection control information setting unit 12 sets the advertising mode to the connection non-priority mode in Step S21 or Step S30, and thus, it is possible to reduce the power consumption in the state of BLE_Sleep.

In contrast, in the technology or the like disclosed in Patent Document 1, the processing of selecting the advertising interval, or the length of time for performing the re-connection processing as described in this embodiment, is not assumed, but the advertising interval, or the length of time for performing the re-connection processing are uniformly set regardless of the situation, and thus, a case where suitable setting is not performed, is also assumed. That is, in this embodiment, the effect of enabling the re-connection processing to be performed on the basis of the suitable setting, is an advantageous effect, compared to a technology such as the technology or the like disclosed in Patent Document 1.

The configuration of the embodiment has been described above. In addition to the embodiment described above, the following configurations may be added. In the embodiment described above, the connection control information setting unit 12 sets the connection control information 15 on the basis of the usage condition information 14. In addition to this, a configuration may be added in which the user sets the connection control information. That is, the user selects any one of three advertising modes of the connection priority mode, the normal mode, and the connection non-priority mode, according to a manual manipulation using an input unit 107. In addition, the user selects the number of seconds of the length of time for performing the re-connection processing, according to the manual manipulation using the input unit 107. The connection control information setting unit 12 detects the selection of the user, and sets the connection control information 15, on the basis of the selection of the user.

By adding such a configuration, the user is capable of setting the re-connection processing, on the basis of the own usage condition of the user. For example, in a case where there is a demand for giving priority to rapid re-connection, it is possible to satisfy the demand by selecting the connection priority mode. On the other hand, in a case where there is a demand for giving priority to long-lasting battery by suppressing the power consumption, it is possible to satisfy the demand by selecting the connection non-priority mode.

A configuration may be added as another additional configuration, in which in a case where the connection control information setting unit 12 sets the connection control information 15 on the basis of the usage condition information 14, selection is performed in consideration of a battery remaining level. In general, a device which is used by being carried, such as the image capture apparatus 1, has a function of measuring the remaining level of the battery for driving the image capture apparatus 1. Therefore, a configuration is added in which the connection control information setting unit 12 sets the connection control information 15, on the basis of both of the usage condition information 14 and the battery remaining level.

Specifically, for example, in a case where the battery remaining level is sufficient, it is considered that the advertising mode to be selected is different from the normal. For example, in Step S17 or Step S19, in a case where the normal mode is selected as the advertising mode, but the battery remaining level is sufficient, the connection priority mode may be selected.

In addition, even in a case where the battery remaining level is low, it is considered that the advertising mode to be selected is different from the normal. For example, in Step S17 or Step S19, in a case where the normal mode is selected as the advertising mode, but the battery remaining level is low, the connection non-priority mode may be selected. In addition, for example, in Step S14, in a case where the connection priority mode is selected as the advertising mode, but the battery remaining level is low, the connection non-priority mode may be selected. Furthermore, in general, a secondary battery such as a lithium ion battery, or a primary battery such as a dry-cell battery is used as the battery.

The image capture apparatus 1 configured as described above is the image capture apparatus 1 capable of performing the wireless communication with the mobile terminal 2, and includes the connection control information setting unit 12 and the communication control unit 13. The connection control information setting unit 12 sets the connection control information. The communication control unit 13 controls a transmission interval of a wireless signal relevant to the wireless communication, on the basis of the connection control information which is set in the connection control information setting unit 12. Accordingly, in the image capture apparatus 1, it is possible to control the transmission interval of the wireless signal, on the basis of suitable setting.

The image capture apparatus 1 further includes a storage unit 209 recording the usage condition information indicating the usage condition at the time of performing wireless communication relevant to the wireless communication with the mobile terminal 2. The connection control information setting unit 12 sets the connection control information, on the basis of the usage condition information recorded in the storage unit 209. Accordingly, in the image capture apparatus 1, it is possible to set the transmission interval of the wireless signal, on the basis of the usage condition information, and to control the transmission interval of the wireless signal.

The communication control unit 13 transmits a wireless signal for performing wireless communication with the portable terminal 2 and reconnects the wireless communication with the mobile terminal 2. Accordingly, in the image capture apparatus 1, it is possible to perform the re-connection processing.

The connection control information further includes information indicating the length of time for performing the re-connection of the wireless communication, the communication control unit 13 performs the re-connection of the wireless communication only for a length of time which is included in the connection control information, and thus, in the image capture apparatus 1, it is possible to suitably set the length of time for performing the re-connection of the wireless communication, and to perform the re-connection processing.

The image capture apparatus 1 further includes function execution means realizing a predetermined function.

The storage unit 209 records the usage condition information by taking suspension of supplying a power source to the function execution means, as an opportunity, the connection control information setting unit 12 sets the connection control information by taking activation of the function execution means, as an opportunity, and the communication control unit 13 performs the re-connection of the wireless communication by taking the activation of the function execution means, as an opportunity. Accordingly, in the image capture apparatus 1, it is possible to perform setting, on the basis of the usage condition at the time of suspending the supply of the power source with respect to an image capture unit 106.

In a case where the communication control unit 13 performs the re-connection of the wireless communication, but the wireless connection is not established, the connection control information setting unit 12 changes the contents of the set connection control information. Accordingly, in the image capture apparatus 1, it is possible to perform setting, according to a result of performing the re-connection of the wireless communication.

The connection control information setting unit 12 selects any setting information from a plurality of information items for setting, on the basis of the usage condition information recorded in the storage unit 209, and sets the selected setting information in the connection control information. Accordingly, in the image capture apparatus 1, it is possible to automatically perform setting by the connection control information setting unit 12.

The connection control information setting unit 12 sets setting information selected by the user from the plurality of information items for setting, in the connection control information. Accordingly, in the image capture apparatus 1, it is possible to perform setting, according to the own demand of the user.

The image capture apparatus 1 is driven by a battery, and the connection control information setting unit 12 sets the connection control information on the basis of both of the remaining level of the battery and the usage condition information indicating the usage condition at the time of performing the wireless communication relevant to the wireless communication. Accordingly, in the image capture apparatus 1, it is also possible to perform setting, in consideration of the remaining level of the battery.

The wireless signal is an advertising signal based on a BLE standard. Accordingly, it is possible for the image capture apparatus 1 to perform the wireless connection on the basis of the BLE.

The wireless communication system S configured as described above, includes the image capture apparatus 1 capable of performing the wireless communication with the mobile terminal 2, and the mobile terminal 2.

The image capture apparatus 1 includes:

the connection control information setting unit 12 setting the connection control information; and the communication control unit 13 controlling the transmission interval of the wireless signal relevant to the wireless communication, on the basis of the connection control information which is set in the connection control information setting unit 12.

The mobile terminal 2 receives the wireless signal which is transmitted from the wireless communication at the transmission interval controlled by the communication control unit 13, and responds to the received wireless signal, and thus, establishes the wireless connection with the image capture apparatus 1, and performs the wireless communication between the image capture apparatus 1 and the mobile terminal 2 by the established wireless connection. Accordingly, it is possible to perform the re-connection processing, on the basis of suitable setting, and to perform the wireless communication between the image capture apparatus 1 and the mobile terminal 2.

Furthermore, the present invention is not limited to the embodiments described above, and modifications, improvements, and the like within a range where the object of the present invention can be attained, are included in the present invention. In the embodiments described above, in Step S14 or the like, in a case where the connection control information setting unit 12 sets the connection control information 15, on the basis of the usage condition information 14, setting is performed on the basis of the BLE connection state when the main power source at the time of performing the wireless communication is turned off. As a modification thereof, setting may be performed on the basis of the previous BLE connection state when the main power source is turned off.

In the embodiments described above, in Step S14 or the like, in a case where the connection control information setting unit 12 sets the connection control information 15, on the basis of the usage condition information 14, setting may be performed on the basis of the BLE connection state when the main power source at the time of performing the wireless communication is turned off. As a modification thereof, the elapsed time from the main power source at the time of performing the wireless communication is turned off may be further considered. For example, when the main power source at the time of performing the wireless communication is turned off, in a case where the BLE connection state is established, and immediately thereafter, the re-connection is performed, a possibility that the user intentionally allows the BLE event to occur, is high. Therefore, as described above, in Step S15, the BLE open processing is performed by setting the advertising mode to the connection priority mode. However, when the main power source at the time of performing the wireless communication is turned off, in a case where the BLE connection state is established, but the re-connection is performed after several hours elapsed, it is not clear whether the user intentionally allows the BLE event to occur or the BLE event accidentally occurs. Therefore, in Step S15, the BLE open processing may be performed by setting the advertising mode to the normal mode.

Similarly, as a modification thereof, whether communication such as the transmission and reception of the image data, is actually performed during the BLE connection at the time of performing the wireless communication, or only the communication connection is performed but substantial communication such as the transmission and reception of the data or the like, is not particularly performed, may be considered. Then, in a case where the communication such as the transmission and reception of the image data, is actually performed, it is considered that the user actively performs the communication based on BLE, and thus, as described above, in Step S15, the BLE open processing is performed by setting the advertising mode to the connection priority mode. In contrast, in a case where only the communication connection is performed, but the substantial communication such as the transmission and reception of the data or the like, is not particularly performed, it is considered that the user does not actively perform the communication based on the BLE, and thus, in Step S15, the BLE open processing may be performed by setting the advertising mode to the normal mode.

In addition, in the embodiments described above, processing at the time of performing pairing has not been particularly described, but it is preferable that the connection of the pairing processing is rapidly performed in order for processing which is intentionally performed according to the manipulation of the user. Therefore, in a case where the pairing processing is performed, the BLE open processing may be performed by setting the advertising mode to the connection priority mode.

Although in the embodiment described above, a tablet terminal is adopted as an example for explaining the mobile terminal 1 to which the present invention is applied, but the embodiment is not limited thereto. For example, the present invention can be applied to electronic devices in general that include reconnection processing after disconnection of communication connection. Specifically, for example, the present invention can be applied to a smartphone, a smart watch, a terminal having a measuring function with a sensor, a notebook personal computer, a printer, a television receiver, a digital camera, a camcorder, a portable navigation device, a mobile phone, a portable game machine, and the like.

The processing sequence described above can be executed by hardware, and can also be executed by software. In other words, the hardware configuration of FIG. 3 is merely illustrative examples, and the present invention is not particularly limited thereto. More specifically, the types of functional blocks employed to realize the above-described functions are not particularly limited to the examples shown in FIG. 3, so long as the mobile terminal 2 can be provided with the functions enabling the aforementioned processing sequence to be executed in its entirety. A single functional block may be constituted by a single piece of hardware, a single installation of software, or a combination thereon.

The functional configurations of the present embodiment are realized by a processor executing arithmetic processing, and processors that can be used for the present embodiment include a unit configured by a single unit of a variety of single processing devices such as a single processor, multi-processor, multi-core processor, etc., and a unit in which the variety of processing devices are combined with a processing circuit such as ASIC (Application Specific Integrated Circuit) or FPGA (Field-Programmable Gate Array).

In the case of having the series of processing executed by software, the program constituting this software is installed from a network or storage medium to a computer or the like. The computer may be a computer equipped with dedicated hardware. In addition, the computer may be a computer capable of executing various functions, e.g., a general purpose personal computer, by installing various programs.

The storage medium containing such a program can not only be constituted by the removable medium 113 of FIG. 2 distributed separately from the device main body for supplying the program to a user, but also can be constituted by a storage medium or the supplied to the user in a state incorporated in the device main body in advance. The removable medium 113 is composed of, for example, a magnetic disk (including a floppy disk), an optical disk, a magnetic optical disk, or the like. The optical disk is composed of, for example, a CD-ROM (Compact Disk-Read Only Memory), DVD (Digital Versatile Disk), Blu-ray (Registered Trademark) or the like. The magnetic optical disk is composed of an MD (Mini-Disk) or the like. The storage medium supplied to the user in a state incorporated in the device main body in advance is constituted by, for example, the ROM 12 of FIG. 2 in which the program is recorded, and a hard disk included in the storage unit 19 of FIG. 2, and the like.

It should be noted that, in the present specification, the steps defining the program recorded in the storage medium include not only the processing executed in a time series following this order, but also processing executed in parallel or individually, which is not necessarily executed in a time series. Further, in this specification, the term of the system shall mean an entire apparatus composed of a plurality of apparatuses, a plurality of means and the like.

The embodiments of the present invention described above are only illustrative, and are not to limit the technical scope of the present invention. The present invention can assume various other embodiments. Additionally, it is possible to make various modifications thereto such as omissions or replacements within a scope not departing from the spirit of the present invention. These embodiments or modifications thereof are within the scope and the spirit of the invention described in the present specification, and within the scope of the invention recited in the claims and equivalents thereof.

What is claimed is:

1. A wireless communication device capable of performing wireless communication with an external device, the wireless communication device comprising:
    a processor,
    wherein the processor executes a program to perform operations comprising:
    setting a connection control information relevant to wireless connection with the external device;
    controlling a transmission interval of a wireless signal relevant to the wireless communication, on the basis of the connection control information which is set in the setting; and
    a memory recording usage condition information indicating a usage condition at the time of performing the wireless communication with the external device,
    wherein the processor is further configured to set the connection control information, on the basis of the usage condition information recorded in the memory.

2. The wireless communication device according to claim 1, wherein the wireless signal is a signal for reconnecting wireless communication with the external device by transmission of the wireless signal.

3. The wireless communication device according to claim 2,
    wherein the connection control information further includes information indicating a length of time for performing the re-connection of the wireless communication, and
    the processor is further configured to perform the re-connection of the wireless communication only for the length of time included in the connection control information.

4. The wireless communication device according to claim 1, further comprising:
    an executer realizing a predetermined function,
    wherein the memory records the usage condition information in response to suspension of supplying a power source to the executer,
    the processor is further configured to set the connection control information in response to activation of the executer, and
    the processor is further configured to perform the re-connection of the wireless communication in response to the activation of the executer.

5. The wireless communication device according to claim 1,
    wherein the processor is further configured to change content of the set connection control information in a case where the processor performs the re-connection of the wireless communication but unable to establish the wireless connection.

6. The wireless communication device according to claim 1, wherein the processor is further configured to select any piece of setting information from a plurality of pieces of setting information, on the basis of the usage condition information recorded in the memory, and sets the selected piece of setting information in the connection control information.

7. The wireless communication device according to claim 1,
wherein the wireless communication device is driven by a battery, and
the processor is further configured to set the connection control information, on the basis of both of a remaining level of the battery and the usage condition information indicating the usage condition at the time of performing the wireless communication.

8. The wireless communication device according to claim 1,
wherein the wireless signal is an advertising signal based on a BLE standard.

9. A wireless communication device capable of performing wireless communication with an external device, the wireless communication device comprising:
a processor,
wherein the processor executes a program to perform operations comprising:
setting a connection control information relevant to wireless connection with the external device; and
controlling a transmission interval of a wireless signal relevant to the wireless communication, on the basis of the connection control information which is set in the setting,
wherein the processor is further configured to set setting information selected by a user from the plurality of pieces of setting information, in the connection control information.

10. A communication system, comprising:
a wireless communication device and an external device with the wireless communication device capable of performing wireless communication with the external device;
wherein the wireless communication device includes a processor,
the processor being configured to set connection control information relevant to wireless connection with the external device;
a memory recording usage condition information indicating a usage condition at the time of performing the wireless communication with the external device,
wherein the processor is configured to set the connection control information, on the basis of the usage condition information recorded in the memory,
the processor is further configured to control a transmission interval of a wireless signal relevant to the wireless communication, on the basis of the connection control information which is set in the setting, and
the external device receives the wireless signal which is transmitted from the wireless communication device at a transmission interval controlled by the processor, and responds to the received wireless signal, and thus, establishes the wireless connection with the wireless communication device, and
performs the wireless communication between the wireless communication device and the external device by the established wireless connection.

11. A wireless communication method executed by a wireless communication device capable of performing wireless communication with an external device, the method comprising:
setting connection control information relevant to wireless connection with the external device;
recording usage condition information indicating a usage condition at the time of performing the wireless communication with the external device,
the connection control information being set on the basis of the recorded usage condition information; and
controlling a transmission interval of a wireless signal relevant to the wireless communication, on the basis of the connection control information that has been set.

12. A non-transitory storage medium containing a wireless communication program allowing a computer capable of performing wireless communication with an external device to realize:
setting connection control information relevant to wireless connection with the external device;
recording usage condition information indicating a usage condition at the time of performing the wireless communication with the external device,
the connection control information being set on the basis of the recorded usage condition information; and
controlling a transmission interval of a wireless signal relevant to the wireless communication, on the basis of the connection control information set by the setting function.

* * * * *